United States Patent [19]

Yalamanchili

[11] Patent Number: 5,301,104
[45] Date of Patent: Apr. 5, 1994

[54] METHOD FOR ALLOCATING PROCESSING ELEMENTS INTERCONNECTED IN A HYPERCUBE TOPOLOGY

[75] Inventor: Sudhakar Yalamanchili, Marietta, Ga.

[73] Assignee: Honeywell Inc., Minneapolis, Minn.

[21] Appl. No.: 563,773

[22] Filed: Aug. 7, 1990

[51] Int. Cl.$^5$ .................. G06F 15/76; G06F 15/16
[52] U.S. Cl. ................... 395/800; 395/650;
364/DIG. 1; 364/229; 364/229.4; 364/229.5;
364/230; 364/230.3; 364/DIG. 2; 364/940;
364/940.67
[58] Field of Search .................. 395/800, 650

[56] References Cited

U.S. PATENT DOCUMENTS

| | | |
|---|---|---|
| 4,247,892 | 1/1981 | Lawrence . |
| 4,567,464 | 1/1986 | Siegel et al. . |
| 4,625,081 | 11/1986 | Lotito et al. . |
| 4,730,322 | 3/1988 | Pollara-Bozzola . |
| 4,739,476 | 4/1988 | Fiduccia . |
| 4,766,534 | 8/1988 | DeBenedictis . |
| 5,050,069 | 9/1991 | Hillis et al. ............ 395/500 |
| 5,170,482 | 12/1992 | Shu et al. ............ 395/800 |
| 5,187,801 | 2/1993 | Zehios et al. ............ 395/800 |

OTHER PUBLICATIONS

"Fundamental Algorithms" by Knuth, published by Addison-Wesley, 1973.
"On the Mapping Problem" by Bokhari, published in *IEEE Transactions on Computers*, No. 3, Mar., 1981.
"A Processor Allocation Scheme for Hypercube Computers" by Kim et al., published by the *1989 Int'l. Conf. on Parallel Process*.
Huang, Chih-Hao, et al., "On Processor Allocation in Hypercube Multiprocessors," COMPSAC 89, IEEE Thirteenth International Computer Software and Applications Conference, 1989, pp. 16-23.
Dutt, Shantanu, et al., "On Allocating Subcubes in a Hypercube Multiprocessor," The Third Conference on Hypercube Concurrent Computers and Applications, vol. 1, 1988, pp. 801-810.

*Primary Examiner*—Paul V. Kulik
*Attorney, Agent, or Firm*—John G. Shudy, Jr.; Kenneth J. Johnson

[57] ABSTRACT

The efficient allocation and deallocation of computer processors interconnected in a binary hypercube topology facilitated by the use of address masks or cube identifiers. The method and system allows individual processors to be coalesced into larger cubes, each having a plurality of processors.

5 Claims, 5 Drawing Sheets

METHOD FOR ALLOCATING PROCESSING ELEMENTS INTERCONNECTED IN A HYPERCUBE TOPOLOGY

FIELD OF THE INVENTION

The present invention relates to a scheme for allocating and deallocating computer processing elements in the performance of computing tasks. More particularly, it relates to a method and system for the efficient allocation and deallocation of computer processing elements in n-dimensional computer architectures.

BACKGROUND OF THE INVENTION

An important consideration in the design and utilization of multiprocessor computers is resource management. That is, in addition to the management of conventional resources such as memory and processor time, it is necessary to manage other resources such as processing elements, or processors, and their communication links.

A specific consideration of this resource management is an ability to efficiently allocate and deallocate processors in consecutive computing tasks. Typically, in large computing applications, multiple computing tasks are executed on a single multiprocessor computer, where each task is comprised of a number of concurrently executable (within precedence constraints) sub-tasks. These sub-tasks generally arise at indeterminate times with varying computational requirements, and each task thereof may not require the use of all processors within the computer. Additionally, in large computing applications, it may be desirable to share the computer across multiple tasks in the manner of prior art timesharing systems.

Therefore, in these situations, it is desirable, and often necessary, to allocate partitions of the computer to each task. A partition, as is well-known in the art, is comprised of a selected group of interconnected processors. The allocation of partitions, disadvantageously, results in the fragmentation of previously linked or paired processors over a period of time which in turn can prevent the execution of tasks requiring a certain number of processors. Thus, an allocation goal is to minimize processor group fragmentation, thereby minimizing the number of requests for processors that are unsatisfied.

In the prior art, various methods have been developed for the allocation and deallocation of processors in the performance of computational tasks. One such method is known as the "buddy system," as disclosed by Donald E. Knuth in *Fundamental Algorithms*, chapter 2.5 (Addison-Wesley 1973). The buddy system, however, fails in some instances to efficiently allocate processors. Consequently, additional computer running time may be required in such situations using the buddy system to perform a particular computing task.

SUMMARY OF THE INVENTION

The present invention is a method and system for the efficient allocation and deallocation of computer processors which are interconnected in a hypercube topology. The present invention allows individual processors, or free subcubes, to be coalesced to form larger cubes, each consisting of a plurality of processors.

It is an object of the present invention, therefore, to provide an allocation and deallocation method and system which is more efficient than possible in the prior art buddy system.

DETAILED DESCRIPTION OF THE PREFERRED EMBODIMENT

Figure 1:
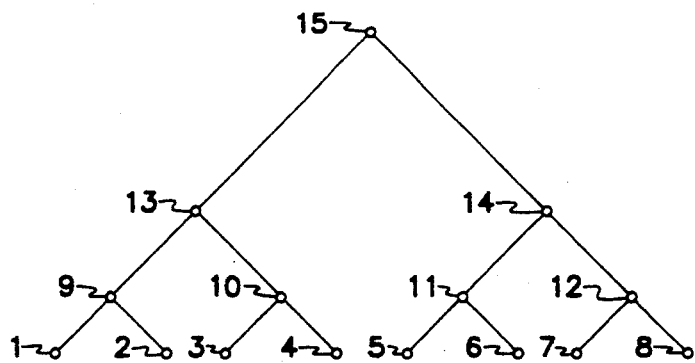
FIG. 1 is a diagram representing a processor allocation scheme of the prior art.

A prior art processor allocation method is represented in FIG. 1 as a binary tree. This prior art method is known as a "buddy system," as discussed in U.S. Pat. No. 4,625,081, and by Knuth, supra.

FIG. 1 is a conceptual representation of the buddy system. In FIG. 1, computer processors 1 through 8 are shown connected in pairs to each of four allocation nodes 9 through 12, respectively. Throughout the remainder of this description, referred-to processors are assumed to be non-busy unless indicated otherwise.

To allocate processors 1 through 8 for a computing task, a node must be interrogated. For example, if a task requires two processors, nodes 9 through 12 corresponding to processor pairs (1,2) through (7,8), respectively, are interrogated to determine which nodes are non-busy. Further, if a task requires four processors, nodes 13 and 14 are similarly interrogated. If, for instance, processor 1 was busy, resulting in a busy signal at node 9, node 13 would also be busy and thus the four-processor task would have to be satisfied by processors 5 through 8. If any of processors 5 through 8 were also busy, a busy signal would result at node 14 and the four-processor request would be unsatisfied.

Now while the buddy system is able to recognize non-busy processors, as described above, the inefficiency of the system is exemplified by the following. Consider two independent requests for a pair of processors such that nodes 9 and 12 are busy, again with reference to FIG. 1. This allocation results in the subsequent availability of only nodes 10 and 11. Further, since nodes 9 and 12 are busy, nodes 13 and 14, respectively, are consequently busy. Next, consider a request for a four-processor. Since nodes 13 and 14 are busy, the request cannot be satisfied. Hence, the computer must first finish the tasks allocated to nodes 9 and 12 before a request for a four-processor may be satisfied. Consequently, efficiency is diminished. In retrospect in this situation, the most efficient processor allocation would have assigned the first request for a two-processor to node 9, and the second two-processor request to node 10, for example, thereby keeping nodes 11 and 12, and hence node 14, non-busy for a four-processor request. Rarely, however, is such foresight of future requests possible.

Figure 2:
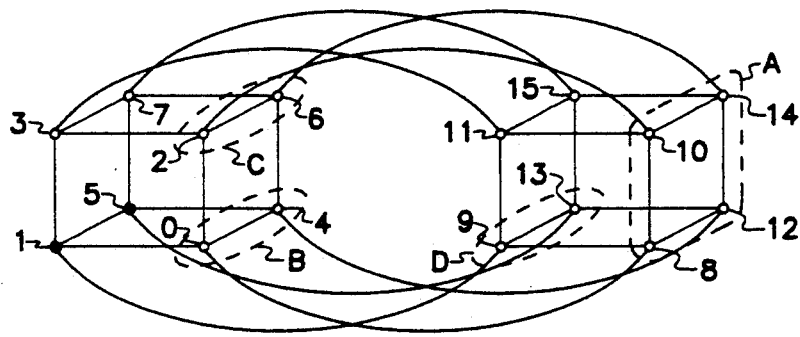
FIG. 2 is a diagram representing another processor allocation scheme of the prior art.

FIG. 2 illustrates a 16 node hypercube architecture of the prior art comprising a higher-dimensional buddy scheme. This buddy scheme architecture is treated as two disjoint eight-noded subcubes, as illustrated in the figure. Further, in the buddy system, any allocation of four-node subcubes or two-node subcubes must be made within either of these two eight-node cubes. A four node cube cannot be allocated such that two nodes are in one eight node subcube and two nodes are in the other. Thus, the allocation of processors 2, 3, 11, and 10 as a four-node cube is not allowed in the buddy system, even though direct interconnections between the four aforementioned nodes form a four-node subcube.

Figure 3:
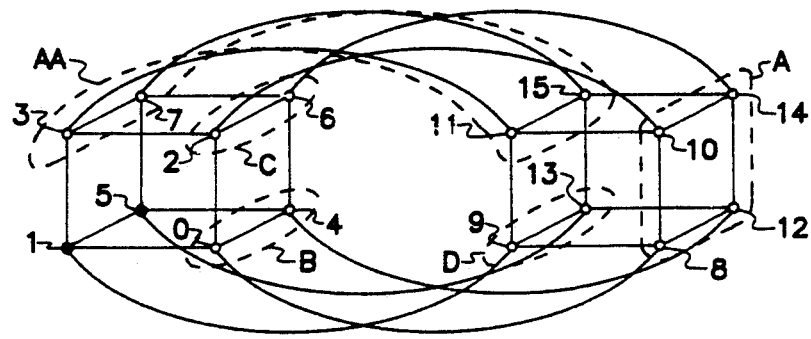
FIG. 3 is a diagram representing the processor allocation scheme of the present invention.

This problem of being unable to allocate subcubes even though they exist is alleviated in the present invention as depicted conceptually in FIG. 3. The hypercube depicted in FIG. 3 is identical to the hypercube depicted in FIG. 2, and illustrates a four-node cube comprised of nodes 3, 7, 11, and 15 (encircled by dashed-line enclosure AA), that cannot be allocated using the buddy system but can be allocated by employing the present invention. The present invention, as will be described in detail below, provides and finds many more allocation possibilities than are available in the buddy system.

Figure 3A:
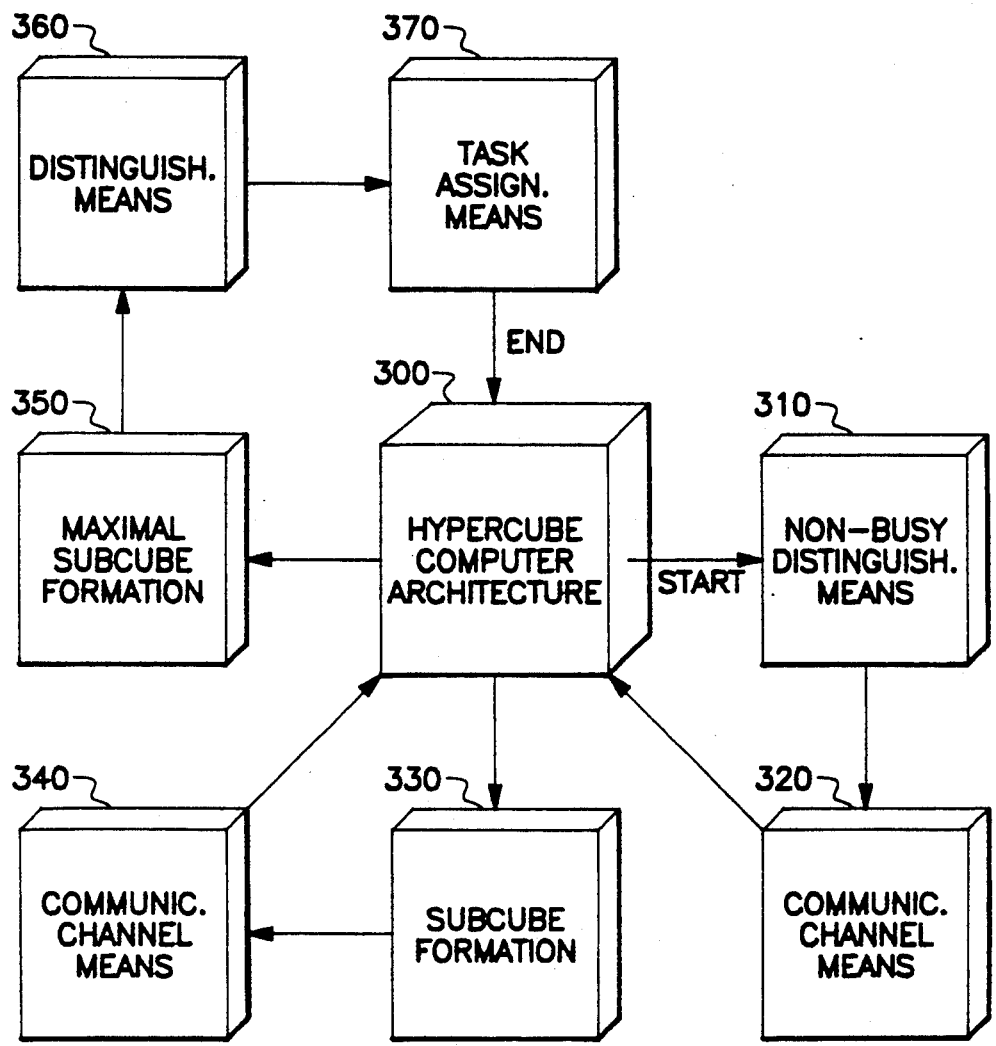
FIG. 3a is a conceptual illustration of the system of the present invention.

Conceptually, the allocation system of the present invention is illustrated in FIG. 3a. Therein, computer processing elements forming a hypercube architecture are represented by block 300. A means 310 for distinguishing between busy and non-busy processors is employed as a first device in the allocation system. This can be realized by a status flip-flop and a software program. Means 310 functions to identify processors that may be allocated to a computing task. In conjunction with means 310, a first communication channel means 320 identifies communication links between neighboring non-busy processors within hypercube 300 as identified by means 310. This is realized by a software program.

Next, subcube formation means 330 allocates subcubes within hypercube 300, in response to the communication links identified between neighboring non-busy processors by means 320.

After subcubes have been formed by means 330, a second communication channel means 340 establishes communication links between the subcubes within hypercube 300 formed by means 330. This is implemented by I.C. chips.

Maximal subcube formation means 350, in response to communication links established by means 340, functions to form maximal subcubes within hypercube 300. These maximal subcubes are maximal in the sense that they are at least as large as the subcubes formed by means 330. This is achieved by a software program.

A distinguishing means 360 then detects subcubes of desired sizes, in accordance with a computing task, from among the maximal subcubes formed by means 350. This is achieved by a software program.

Finally, a task assigning means 370 allocates the subcubes within hypercube 300 detected by means 360 to the computing task. This is achieved by a software program.

Turning, now, from a conceptual description of the prior art and the present invention, the method and system of the present invention will be described. The invention requires address masks, or cube identifiers, to be assigned to subcubes of various sizes. A cube identifier provides a simple representation for a subcube of a given size in a hypercube. The number of subcubes of size $2^k$ in a hypercube of $N=2^n$ processing elements is $^nC_k 2^{n-k}$. Herein, the term $^nC_k$ is a well-known expression of the term $n!/k!(n-k)!$. Specifically, the term $^nC_k$ determines the number of unique cube identifiers for a given number of *s (hereinafter, *s designates "a plurality of '*'".) The term $2^{n-k}$ determines the number of unique cube identifiers with * in the same bit positions. The expression $^nC_k 2^{n-k}$ follows from the fact that any subcube of size $2^k$ can be identified by a cube identifier with k bits replaced by k *s, where * may be either 0 or 1. For example, in a 16-processing element hypercube there are 8 subcubes of size 8 and 24 subcubes of size 4.

Tables 1 through 3 list cube identifiers and resulting numerical values for various combinations of binary values. Specifically, Table 1 lists cubes generated when constant values occupy all bit positions. Table 2 lists cubes generated when a *, representing 1 or 0, replaces a constant binary bit. Table 3, similarly, lists cubes generated when a * replaces two constant binary bits. In Table 3, *L denotes the leftmost * in the binary sequence, and *R denotes the rightmost * in the sequence. In Table 3, line 3, for example, a cube consisting of processing elements 2, 8, 10, and 0 is uniquely identified by the cube identifier (*0*0), where * may be 0 or 1.

In the present invention, it is assumed that incoming processor requests are for subcubes, with blocks of free processing elements identified by their corresponding cube identifiers. The system is depicted in FIG. 4:

1. Cube identifiers 402, (406 and 408), and (412, 414, and 416) for subcubes of size $2^k$ denoted by blocks 400, 404, and 410, respectively, are linked together to form horizontal lists. As shown in FIG. 4, there are n such lists for a $N=2^n$ processing element hypercube architecture. In the preferred embodiment, $N=16$ and thus $n=4$. For example, the list corresponding to block 410 contains two free 4-node cubes denoted by cube identifiers 412 (00) and 414 (11). The list corresponding to block 404, further, contains a 2-node cube 406 (011*).

2. An array of $n=5$ pointers (AVAIL[0, ..., n=4]) denoted by horizontal arrows 401, 405, and 411, etc. are pointed at the heads of the $n=5$ lists (pointers for lists corresponding to blocks 418 and 420 are not shown). Each list may contain one or more cube identifiers and pointers which point to the next cube identifier of the list. Initially, there is only one entry in these lists. This single entry is AVAIL[n] which points to an entry having a cube identifier with * in each bit position thereof. Also, the variable AVAILABLE-PE represents the number of non-busy processing elements at a given time in the hypercube.

Figure 4:
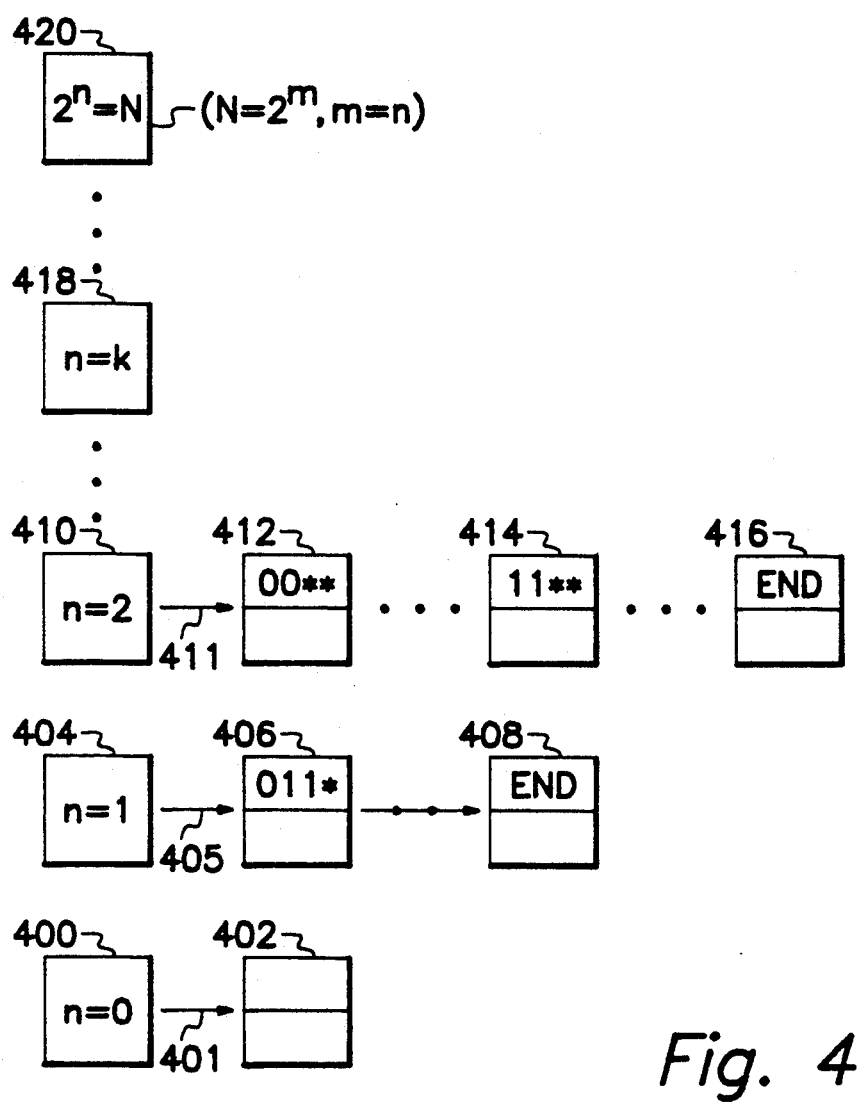
FIG. 4 is a diagram representing lists of cube identifiers which comprise part of the present invention.
Figure 5A:
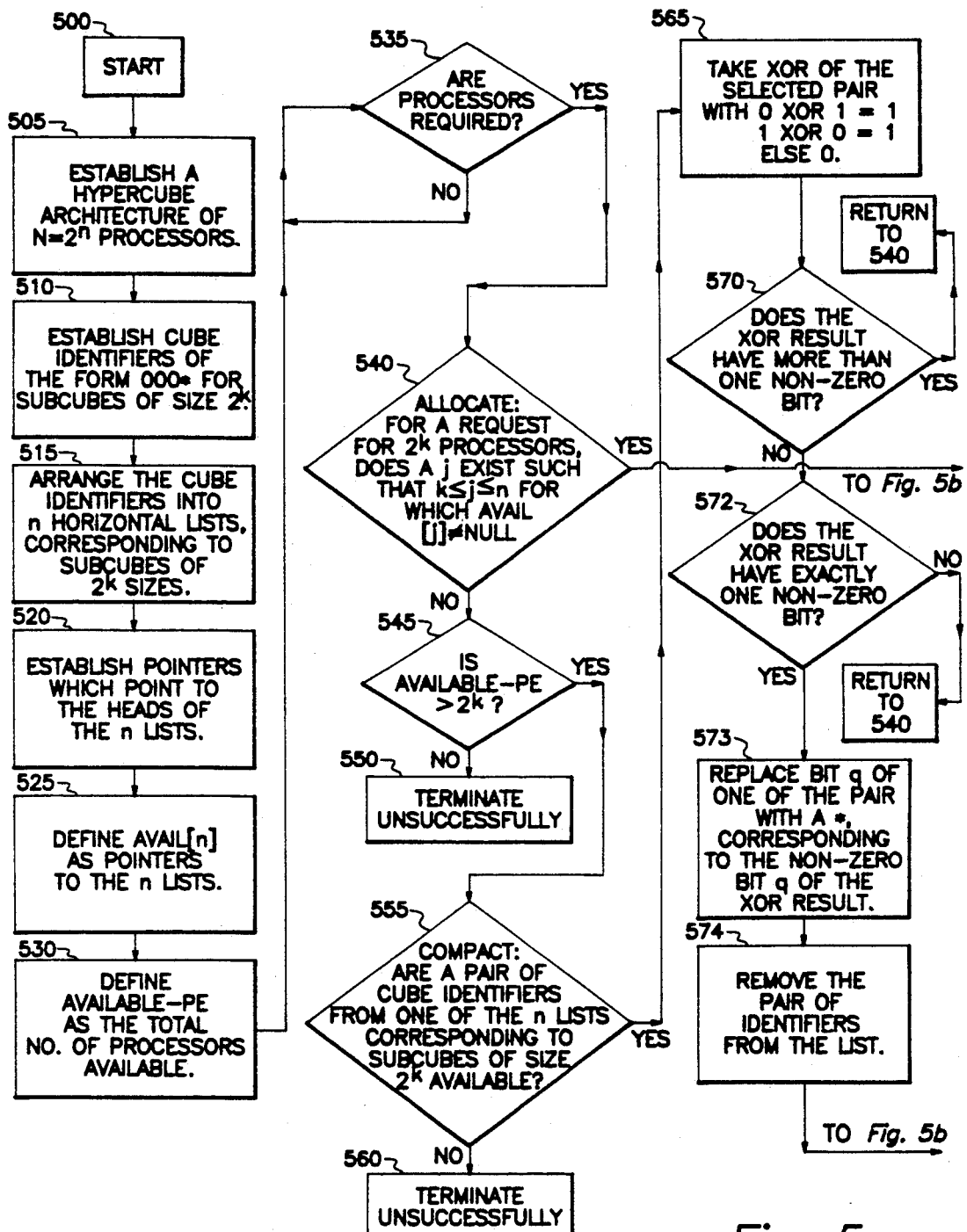
FIGS. 5a-b are a flowchart of the method of the present invention.
Figure 5B:
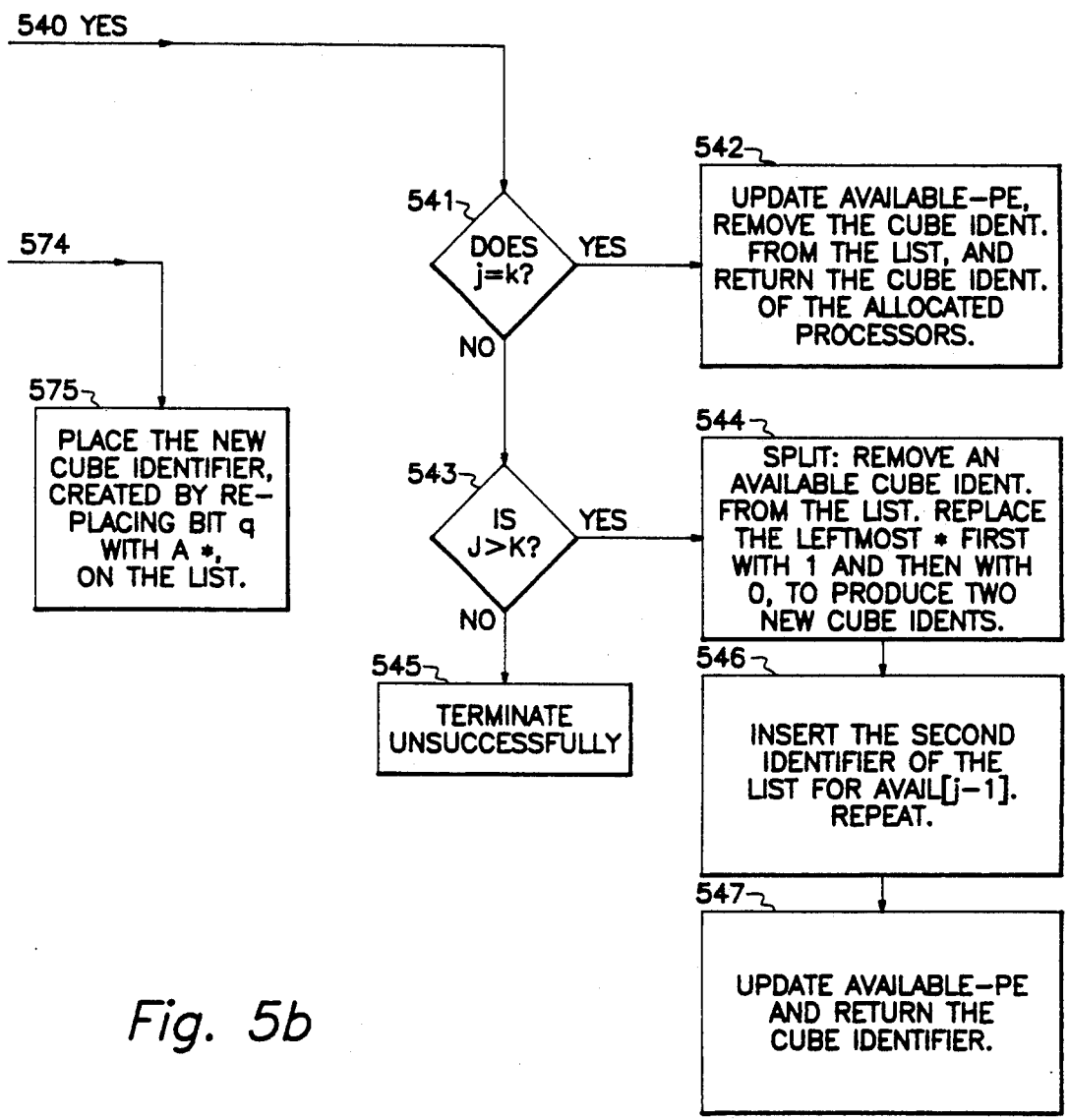

Now, two functions, ALLOCATE and DEALLOCATE, access the list structure of FIG. 4. ALLOCATE operates as follows, in satisfying a request for $2^k$ processing elements:

3. The smallest j is found such that $k<=j<=n$, for which AVAIL[j]<>NULL. If such a j is found, the method proceeds to step 4, below. If no such j is found ana if AVAILABLE-PE>$2^k$, then selected cube identifiers are compacted using function COMPACT (as will be described below), and a search is again made for the smallest j such that $k<=j<=n$, for which AVAIL[j]<>NULL. If selected cube identifiers have already been compacted for this request, the request is terminated unsuccessfully.

Note that compaction is performed only if there are actually a number of unused processing elements which may satisfy the request, as determined by AVAILABLE-PE. AVAILABLE-PE thus prevents compaction when most of the processing elements are being utilized.

The function COMPACT groups available processing elements into larger sized subcubes. The process of compaction is performed by finding cube identifiers of free subcubes that can be merged to form one cube identifier corresponding to a larger cube. COMPACT functions by using the sequence of operations described below, for each list of cube identifiers pointed to by an entry in AVAIL until no further compaction is possible (compaction proceeds from the lowest dimension to the highest):

3.a. For the given list, a pair of cube identifiers is obtained from the list. If there is only one cube identifier, or all pairs have been examined, COMPACT is terminated.

3.b. The exclusive-OR of the pair of identifiers is taken, with * XOR 0 = 1 and * XOR 1 = 1, all other results being zero. If the XOR result has more than one non-zero bit, the process returns to step 3.a.

3.c. If the XOR result of step 3.b. has only one non-zero bit, q, a new cube identifier is then created by replacing bit q of one of the pair of identifiers with a *. The pair of identifiers are then removed from the list. Then, the new cube identifier is placed on the list corresponding to the next larger size block. If the XOR result of step 3.b. has more than one non-zero bit or has all zero bits, the process then returns to step 3.a.

COMPACT requires consideration of all pairs of identifiers in a list. This requirement may be alleviated, however, by ordering the identifiers in a list according to the bit positions in which * occurs. Then, these bit positions in which * appears can be interpreted as a binary number. Identifiers are then organized in increasing order according to this value. Using this ordering scheme, identifiers which can be combined will tend to occur relatively closely to each other in the list since such pairs of identifiers must have an equal number of *s, and all of them should occur in the same bit positions. It is noteworthy that while this ordering scheme reduces time for compaction, it increases the time for inserting identifiers into a list.

4. If j=k, AVAILABLE-PE is updated, the cube identifier is removed from the corresponding list, and the cube identifier of the allocated processing elements is returned. If j<>k, the method proceeds to step 5.

5. If j>k, then a split is required using function SPLIT which is effectively the reverse of COMPACT:

5.a. The cube identifier is removed from the list, and two new cube identifiers are created corresponding to subcubes of size $2^{j-1}$ by replacing the leftmost * first with a 1, and then with a 0, producing two new cube identifiers, respectively.

5.b. The second identifier is inserted into the list for AVAIL[j-1]. The process is repeated for the first cube identifier until a cube identifier for $2^k$ processing elements is derived.

5.c. AVAILABLE-PE is then updated, and the cube identifier is returned.

As a fundamental example of the operation of the aforementioned steps, consider a request for a two node subcube. Further assume that the two-node subcube 406 (011*) and pointed to by 405 (AVAIL[1]) is allocated or busy. Here, then, $2^k=2$, and k=1. The smallest j such that k<=j<=n, or, 1<=j<=5, is j=2. Thus, one of the cube identifiers in AVAIL[2] is selected, such as 412 (00**). This identifier is split in step 5 to form two new identifiers, (001*) and (000*). Either new cube identifier can be allocated to satisfy the request with the other being placed on AVAIL[1]. If there are m *s in a cube identifier, it is possible to generate any one of m pairs of distinct new cube identifiers. Selecting the leftmost * to generate the new identifier operates as an attempt to pack requests into the higher dimensions of the cube. Depending upon the profile of requests, this will tend to leave free processing elements in the form of larger free subcubes, in the lower dimensions of the cube.

As another example of the operation of the present invention, assume that the state of this list is such that AVAIL[1] has identifiers (001*) and (000*), AVAIL[0] has (1000) and (1100), and AVAIL[2] through AVAIL[4]=0. If a request for a four-node subcube is received, ALLOCATE will fail. However, since AVAILABLE-PE >4, COMPACT will be invoked. In COMPACT, identifiers (000*) and (001*) will be coalesced into (00**) and placed on AVAIL[2]. The identifier will then be coalesced as a four-node subcube. The insertion of identifiers into a list occurs after an invocation of a SPLIT function in the ALLOCATE procedure, and in DEALLOCATE. DEALLOCATE, which frees a block of processing elements, operates simply by inserting a cube identifier into the list.

COMPACT is invoked by ALLOCATE. Alternatively, whenever a subcube of size $2^k$ is deallocated, it is possible to examine other identifiers in AVAIL[K] and determine whether it can be coalesced with an existing free subcube. If so, the new cube identifier (for a $2^{k+1}$ cube) is created and then it is deallocated. In this way AVAIL[] always contains a list of maximal free subcubes, maximal in the sense that they cannot be combined with another free subcube of the same size to form a larger free subcube. The tradeoff is that coalescing of subcubes is performed on every deallocation as opposed to periodically invoking COMPACT as a "garbage collection" mechanism.

It should be noted that while maximal free subcubes are available, this does not guarantee the detection of the largest free subcube available. For example, with reference again to FIG. 3, consider the maximal free subcubes (4,5,7,6), (9,13,15,11), and (14,12). The remaining processing elements are assumed to be busy. All of these subcubes, then, are maximal free subcubes. However, when considering the set of free processing elements, the largest free subcube that may be formed is (4,5,7,6,12,13,15,14). Detection of the largest free subcube is a much more difficult problem, falling outside of the scope of the present invention.

It should also be noted that the system as described above may seem similar to the buddy system, but the creation and utilization of functions COMPACT and SPLIT result in a system having a novel behavior, considerably different from and more advantageous than the buddy system. Specifically, COMPACT and SPLIT exploit the topology of the hypercube which is not possible in the buddy system. That is, in the buddy system, the size of each block of processors is restricted to a power of 2. When a block is split into two blocks of equal size, the resulting blocks are buddies, such that each block has exactly one buddy. When free blocks are merged into larger sized blocks, only blocks which are buddies can be merged. In this terminology, a block of processing elements in a hypercube has more than one buddy.

Referring again to FIG. 3, processing elements (0,2) may be combined with elements (1,3) to form a 2-cube. Alternatively, elements (0,2) could be combined with elements (8,10) or (4,6) to form a 2-cube. The extensive interconnection topology of the hypercube allows subcubes of any size to be combined with several other subcubes of the same size to produce a higher-dimensional subcube. Therefore, ALLOCATE differs from the buddy system allocation strategy of Knuth in the way in which free blocks are merged, and in the way in which identifiers are represented and inserted.

I claim:

1. A method of allocating processing elements interconnected in a hypercube topology comprising the steps of:

providing identifiers for subcubes within the hypercube topology where the identifiers are comprised of constant binary bits and variable binary bits which correspond to numbered vertices in the hypercube topology;

distinguishing between allocated and unallocated processing elements;

creating a plurality of lists of available subcubes with the identifiers where each of the lists contains the available subcubes of a particular size;

receiving a request to allocate a subcube of the size of $2^k$ (k is a whole integer);

allocating one of the available subcubes of the size of $2^k$ if one exists; combining a plurality of the available subcubes from the lists to form a subcube of the size of $2^k$ if the size of all the available subcubes is less than $2^k$, and then removing the identifiers of the subcubes used to form the subcube of the size $2^k$ from the lists;

splitting one of the available subcubes into two smaller subcubes, one of which is the size of $2^k$ if all of the available subcubes are of a size greater than $2^k$, and removing the identifier of the subcube which has been split from the list;

deallocating the allocated subcubes upon command; and combining deallocated subcubes with the available subcubes in the lists to create maximal subcubes by identifying a pair of identifiers of subcubes which have the same size, performing an exclusive-OR logic function on the pair of identifiers, analyzing the exclusive-OR result to determine whether exactly one non-zero bit is present in the result, and replacing one non-zero bit of the result with a variable binary bit.

2. The method of claim 1, wherein the step of splitting the subcubes is further comprised of the step of replacing the variable binary bit which is leftmost in the identifier of the subcube which has been split, first with a one and then with a zero to provide two new subcube identifiers.

3. A method of allocating processing elements interconnected in a hypercube topology comprising the steps of:

providing identifiers for subcubes within the hypercube topology where the identifiers are comprised of constant binary bits and variable binary bits which correspond to numbered vertices in the hypercube topology;

distinguishing between allocated and unallocated processing elements;

creating a plurality of lists of available subcubes with the identifiers where each of the lists contains the available subcubes of a particular size;

receiving a request to allocate a subcube of the size of $2^k$ (k is a whole integer);

allocating one of the available subcubes of the size of $2^k$ if one exists;

combining a plurality of the available subcubes from the lists to form a subcube of the size of $2^k$ if the size of all the available subcubes is less than $2^k$, and then removing the identifiers of the subcubes used to form the subcube of the size $2^k$ from the lists;

splitting one of the available subcubes into two smaller subcubes, one of which is the size of $2^k$ if all of the available subcubes are of a size greater than $2^k$, and removing the identifier of the subcube which has been split from the list;

replacing the variable bit which is leftmost of the identifier of the subcube which has been split, first with a one and then with a zero to provide two new subcube identifiers;

deallocating the allocated subcubes upon command; and combining deallocated subcubes with the available subcubes in the lists to create maximal subcubes.

4. The method of claim 3, wherein the steps of combining the available and deallocated subcubes is further comprised of the steps:

identifying a pair of cube identifiers of subcubes which have the same size;

performing an exclusive-OR logic function on the pair of identifiers;

analyzing the exclusive-OR result to determine whether exactly one non-zero bit is present in the result; and replacing one non-zero bit of the result with a variable binary bit.

5. A method for the allocation of $2^k$ (wherein k is a whole integer) processing elements interconnected in a hypercube topology and located at sequentially numbered vertices thereof, said method comprising:

establishing cube identifiers comprised of constant binary bits and variable binary bits which correspond to the numbered vertices;

assigning a unique cube identifier to each plurality of subcubes of a plurality of sizes;

identifying said cube identifiers of subcubes of said plurality of sizes having the same size;

linking together said cube identifiers of subcubes of said plurality of sizes having the same size to form a plurality of lists;

sequentially numbering each of said plurality of lists;

establishing a plurality of pointers corresponding to one of each of said plurality of lists;

sequentially numbering each of said plurality of pointers;

identifying a maximum number of said sequential numbering;

identifying all integers j greater than or equal to k and concurrently less than or equal to said maximum number of said sequential numbering;

identifying a minimum integer of said integers;

identifying a pair of cube identifiers from one of the plurality of lists corresponding to subcubes of size $2^k$;

performing an exclusive-OR logic function on the pair of cube identifiers;

analyzing the exclusive-OR result to determine whether more than one non-zero bit is present in the result;

analyzing the exclusive-OR result to determine whether exactly one non-zero bit is present in the result;

replacing one non-zero bit of the result with a variable binary bit;

removing the pair of cube identifiers from the corresponding list;

identifying the relative numeric magnitudes of j and k;

removing the cube identifier from the list and returning the cube identifier of allocated processors if j=k; and if j>k, removing an available cube identifier from the list, replacing the variable binary bit which is leftmost, first with a 1 and then with a 0 to produce two new cube identifiers.

* * * * *